(12) United States Patent
Halberstadt

(10) Patent No.: US 8,659,284 B2
(45) Date of Patent: Feb. 25, 2014

(54) LOAD CURRENT DETECTION IN ELECTRICAL POWER CONVERTERS

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 355 days.

(21) Appl. No.: 13/059,411

(22) PCT Filed: Aug. 12, 2009

(86) PCT No.: PCT/IB2009/053555
§ 371 (c)(1),
(2), (4) Date: Feb. 16, 2011

(87) PCT Pub. No.: WO2010/020909
PCT Pub. Date: Feb. 25, 2010

(65) Prior Publication Data
US 2011/0133722 A1    Jun. 9, 2011

(30) Foreign Application Priority Data

Aug. 21, 2008 (EP) .................................. 08105097

(51) Int. Cl.
*G01R 19/00* (2006.01)
(52) U.S. Cl.
USPC ....................................... 324/76.11
(58) Field of Classification Search
USPC ............................................ 76/11
See application file for complete search history.

(56) References Cited

U.S. PATENT DOCUMENTS

| | | | | |
|---|---|---|---|---|
| 5,068,776 A | * | 11/1991 | Polivka ........................... | 363/17 |
| 6,344,979 B1 | * | 2/2002 | Huang et al. ..................... | 363/16 |
| 6,366,484 B1 | * | 4/2002 | Jin ................................... | 363/95 |
| 6,462,965 B1 | * | 10/2002 | Uesono ....................... | 363/21.14 |
| 7,688,600 B2 | * | 3/2010 | Sauerlander et al. .......... | 363/17 |
| 7,944,716 B2 | | 5/2011 | Halberstadt | |
| 8,199,534 B2 | | 6/2012 | Halberstadt | |
| 2004/0155639 A1 | | 8/2004 | Mobers | |
| 2005/0073862 A1 | * | 4/2005 | Mednik et al. .................. | 363/20 |

FOREIGN PATENT DOCUMENTS

| | | | |
|---|---|---|---|
| CN | 101151789 A | | 3/2008 |
| DE | 10200504758 A1 | | 2/2007 |
| DE | 102005047548 A1 | * | 2/2007 |
| EP | 2 115 863 A | | 11/2009 |
| JP | 2003134817 A | * | 5/2003 |
| WO | 2006056928 A | | 6/2006 |

OTHER PUBLICATIONS

Erickson, Robert W. & Maksimovic, Dragan. "A Multiple-Winding Magnetics Model Having Directly Measurable Parameters." Power Electronics Specialist Conference (PESC '98) pp. 7.

* cited by examiner

*Primary Examiner* — Arleen M Vazquez
*Assistant Examiner* — Brent J Andrews

(57) ABSTRACT

An electrical power converter has a transformer (4) and detecting circuitry for deriving a reconstructed output or load current. In a first aspect of the invention the load current is computed by subtracting a scaled version of the time integral of the primary voltage ($V_{cap}$) from a scaled version of the primary current ($I_{prim}$). In a second aspect of the invention the load current is computed by subtracting a scaled version of the time integral of the voltage ($V_{aux}$) across an auxiliary winding (24) from a scaled version of the primary current ($I_{prim}$).

2 Claims, 5 Drawing Sheets

LOAD CURRENT DETECTION IN ELECTRICAL POWER CONVERTERS

This invention relates to the detection of load currents in electrical power converters, particularly resonant converters.

According to one aspect the invention provides an electrical power converter comprising a transformer having a primary circuit and a secondary circuit, the primary circuit being energisable by an AC signal to induce a secondary AC signal across the secondary circuit for delivering a load current, detecting circuitry operative to detect a first electrical signal representative of the current in the primary circuit and a second electrical signal representative of the time integral of the voltage across the primary circuit, scaling circuitry for scaling or proportioning the first electrical signal with respect to the second electrical signal by a scaling factor dependent on the leakage and magnetising inductances of the transformer and computational circuitry for combining the scaled first and second electrical signals so as effectively to subtract the scaled second electrical signal from the scaled first electrical signal to derive a difference signal which is representative of the load current reflected on to the primary side of the transformer and is accordingly representative of the actual load current.

Thus, output or load current reconstruction is possible without the need for an auxiliary winding. This is achieved by determining the difference between the primary current and the time integral of the voltage across the primary winding of the transformer.

According to another aspect the invention provides an electrical power converter comprising a transformer having a primary circuit and a secondary circuit, the primary circuit being energisable by an AC signal to induce a secondary AC signal across the secondary circuit for delivering a load current, detecting circuitry for deriving an electrical signal representative of the load current, wherein the detecting circuitry comprises a circuit element for deriving a first electrical signal representative of the current in the primary circuit, auxiliary circuitry for deriving a second electrical signal representative of the magnetising current flowing in the transformer and computational circuitry for combining the first and second signals so as effectively to subtract the second signal from the first signal to derive a difference signal which is representative of the load current reflected onto the primary side of the transformer and is accordingly representative of the actual load current, wherein the auxiliary circuitry comprises an auxiliary winding across which an auxiliary voltage is induced and integrating circuitry for integrating the auxiliary voltage with respect to time to derive the second electrical signal and wherein the relative magnitudes of the first and second electrical signals are scaled or proportioned in dependence upon the degree of coupling of the auxiliary winding to the primary and secondary circuits.

By means of this aspect, output current reconstruction is possible with an auxiliary winding by computing the difference between the primary current and the time integral of the voltage across the auxiliary winding, with these signals being scaled as appropriate. Thus, the auxiliary winding can be coupled with the primary winding of the transformer, giving the advantage that there is no need for mains isolation for the auxiliary winding.

Embodiments of the invention will now be described, by way of example, with reference to the accompanying drawings, in which.

Figure 1:
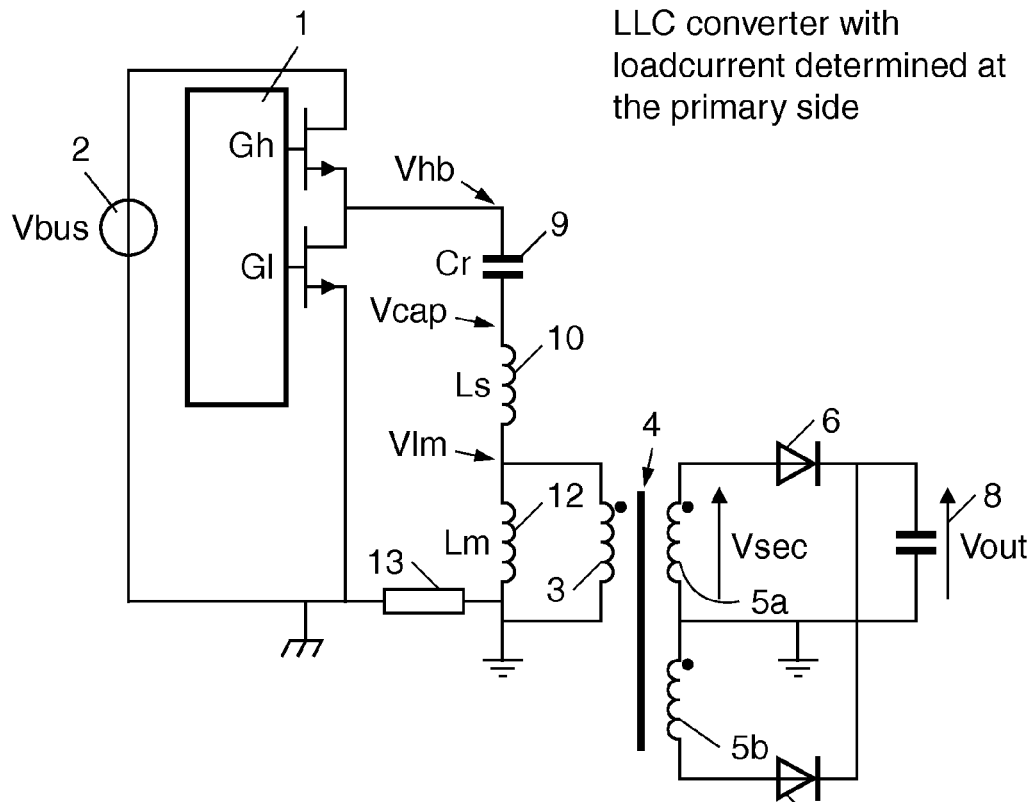
FIG. 1 shows a general circuit diagram of a series resonant converter.
Figure 3:
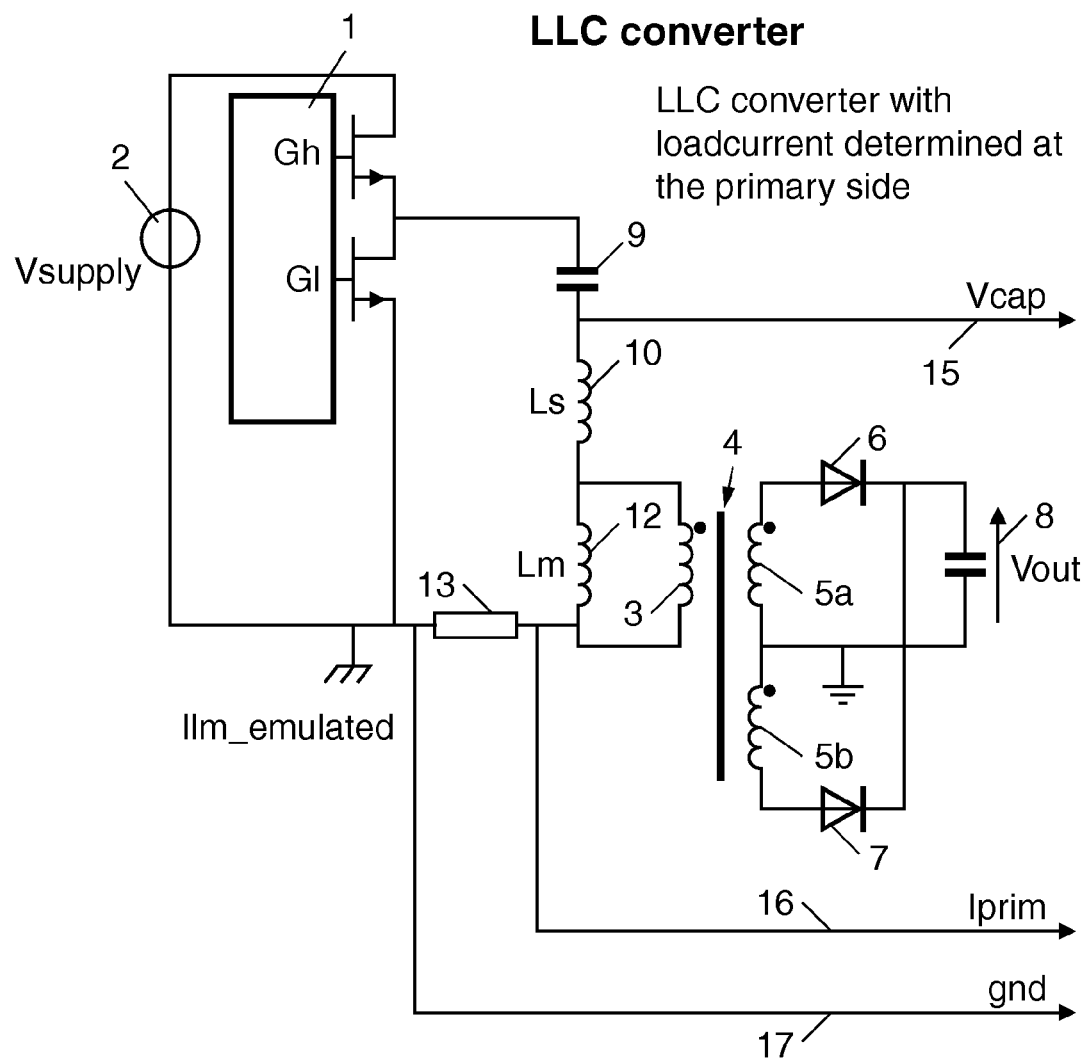
Figure 4:
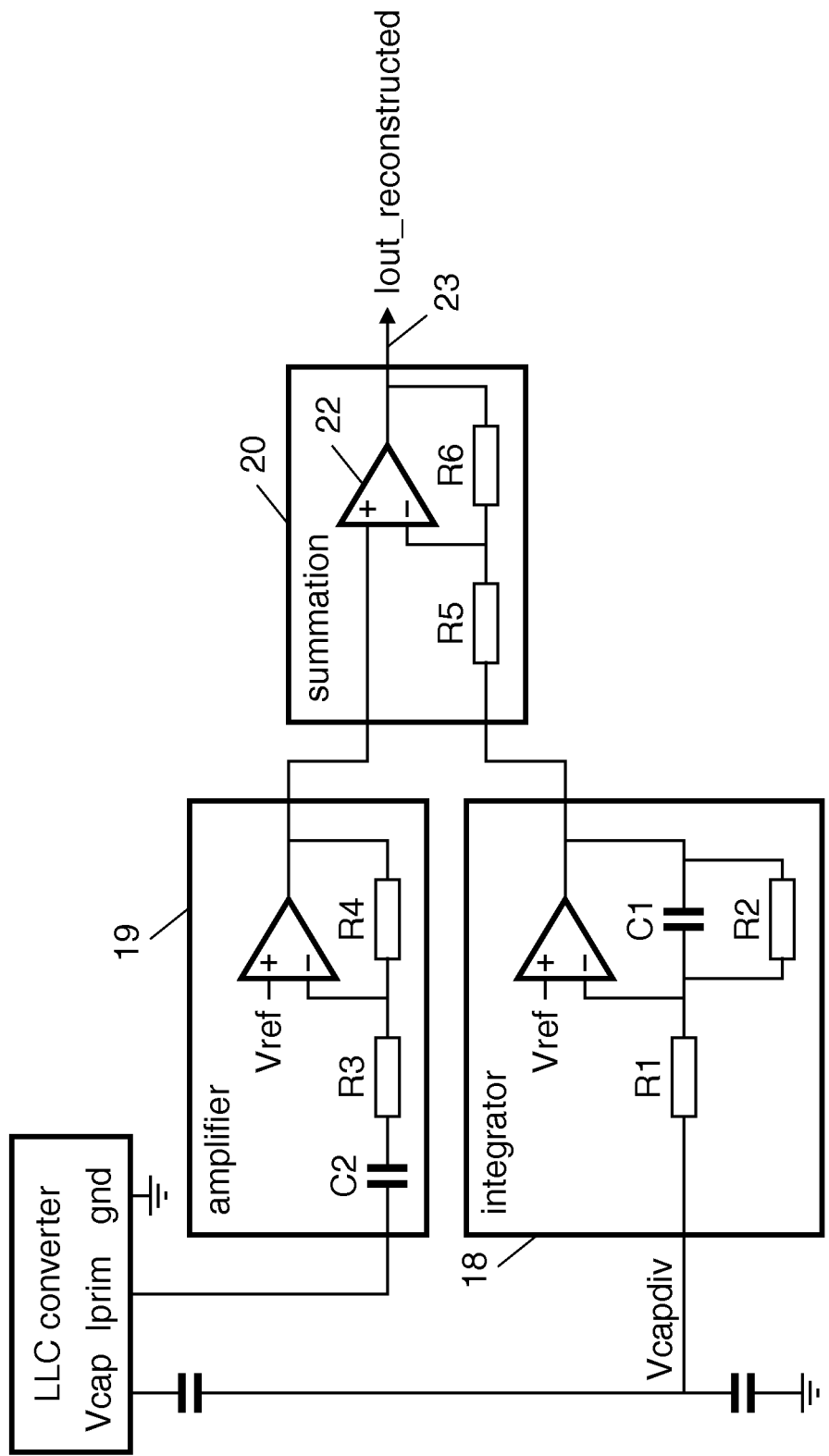
Figure 5:
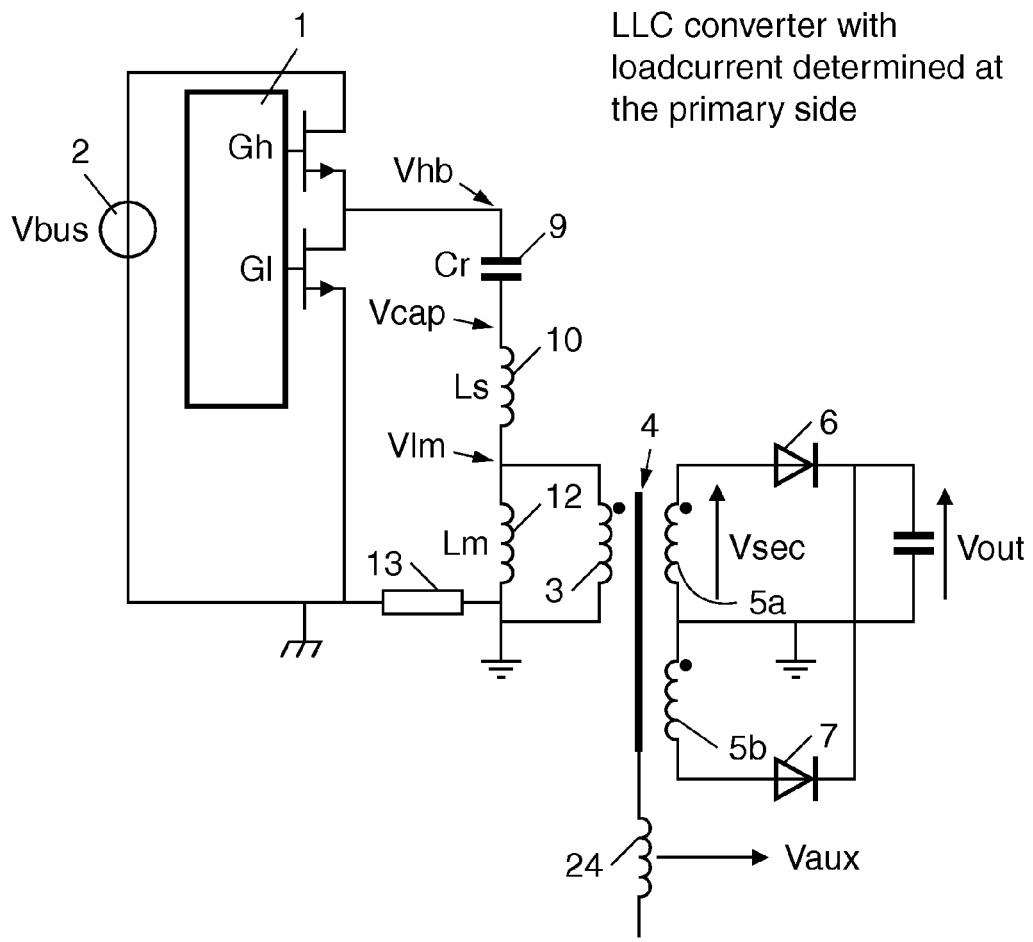
Figure 6:
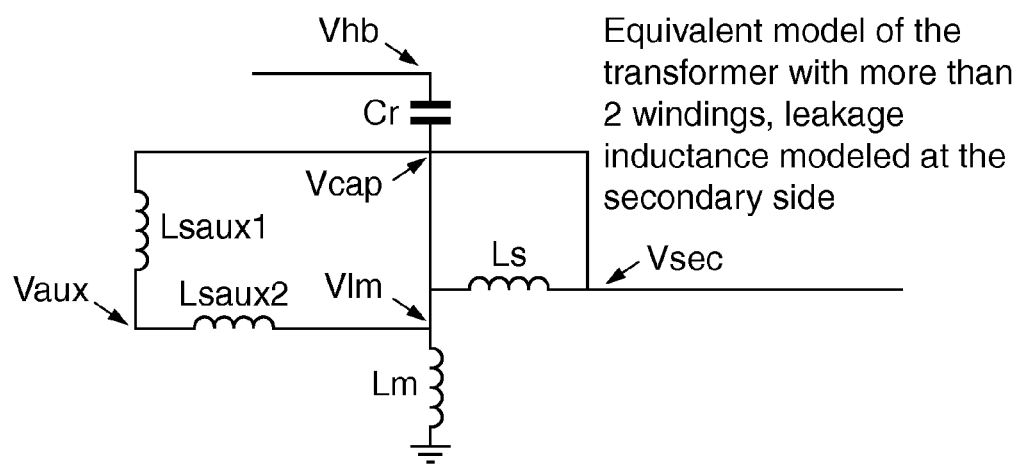
Figure 7:
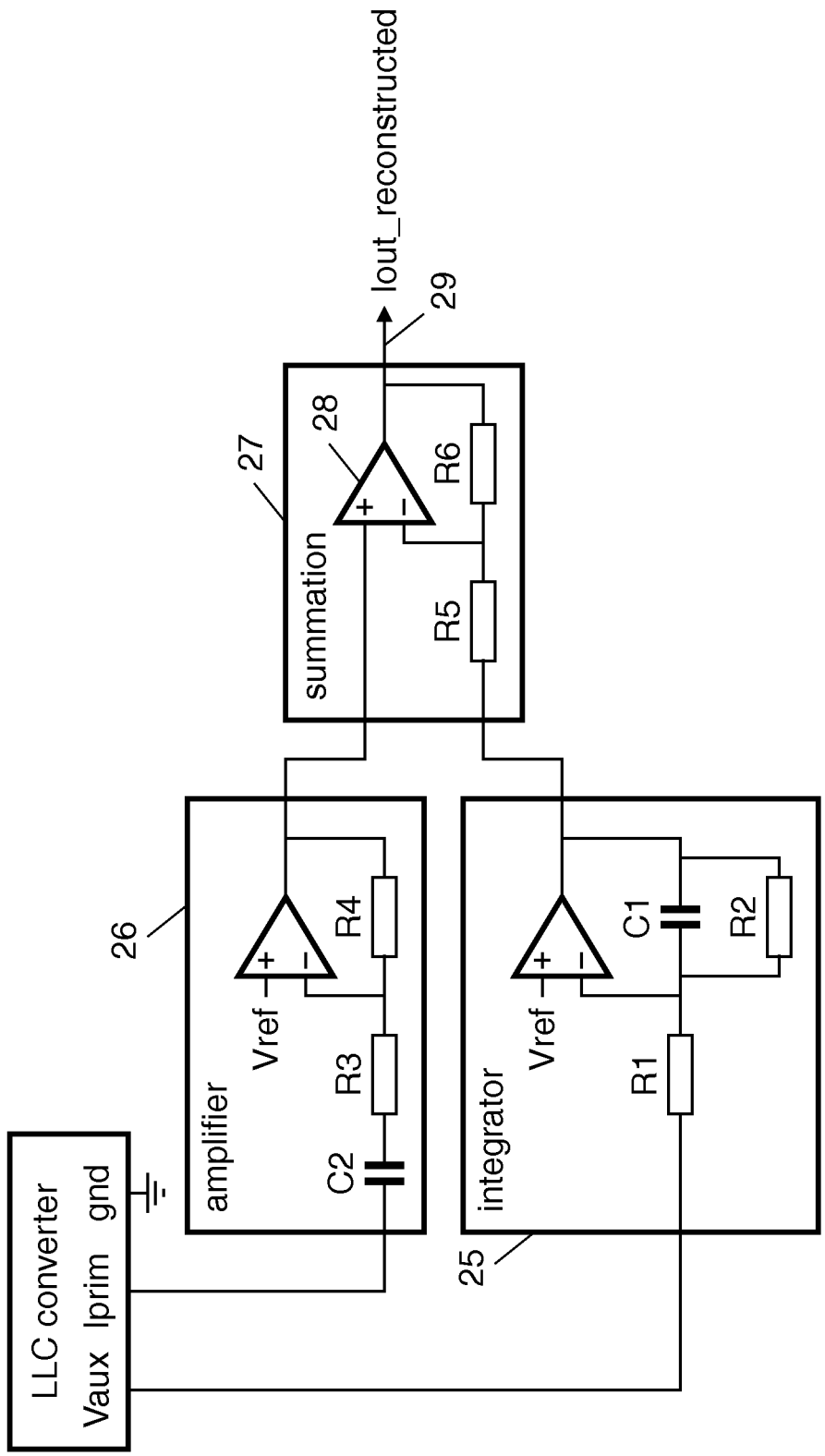

FIG. 3 is a view similar to that of FIG. 1 but showing output signals used in the first aspect of the invention, FIG. 4 shows how the output signals of FIG. 3 are processed, FIG. 5 is similar to FIG. 1 but shows an auxiliary winding associated with the transformer of the converter according to the second aspect of the invention, FIG. 6 shows an equivalent circuit of the transformer of FIG. 5, and FIG. 7 shows how useful output signals from the circuit of FIG. 6 are processed.

A general circuit diagram of a series resonant converter is given in FIG. 1. The converter comprises circuitry 1 for converting a DC input 2 (marked $V_{bus}$) into an AC signal which energises the primary winding 3 of a transformer 4. The induced secondary AC signal across the split secondary winding 5a,5b of the transformer 4 is rectified by second converter circuitry, including two diodes 6 and 7, into a DC output voltage 8 marked $V_{out}$ for delivering a load current.

The first converter circuitry induces rectangular profile pulses Gh and GI in alternate sequence at a controlled frequency. The pulses are fed into a resonant circuit consisting of a capacitor 9, series leakage inductance 10 and magnetising inductance 12 carrying the magnetising current. The transformer 4 is represented as an ideal transformer with a turns ratio of N:1:1, being the ratio of turns of the primary winding 3, one half 5a of the split secondary winding and the other half 5b of the split secondary winding. The primary winding 3 and the magnetising inductance 12 are shown in parallel, this parallel arrangement carrying the primary current and being in series with the leakage inductance 10 and the capacitor 9. This parallel arrangement is also in series with a sensing resistor 13 which carries the primary current. Thus, the voltage across the resistor 13 is representative of the primary current.

Figure 2:
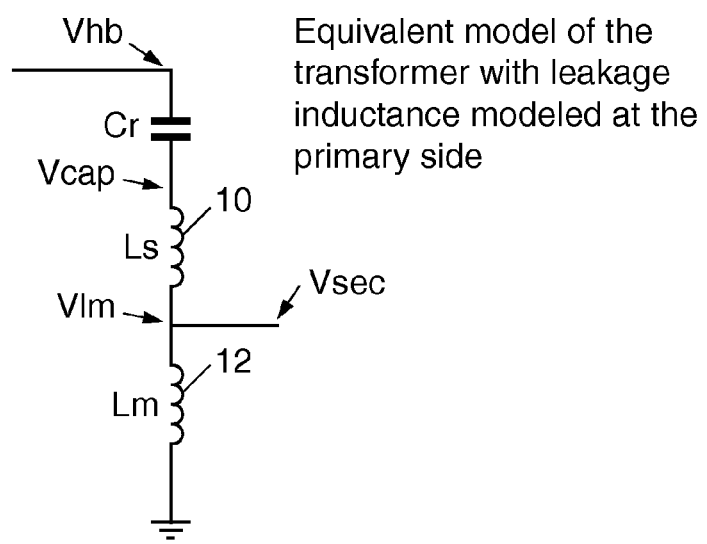
FIG. 2 shows an equivalent circuit of a transformer of the converter of FIG. 1.

FIG. 2 shows an equivalent circuit of the transformer with leakage inductance modelled at the primary side. The voltage $V_{lm}$ is the voltage $V_{cap}$ minus the voltage across the inductance 10. Also, the voltage across the inductance 10 is $L_s$ multiplied by the first derivative of the primary current with respect to time, giving the equation:

$$I_{out} = I_{prim}\left(1 + \frac{Ls}{Lm}\right) - \frac{1}{Lm}\int V_{cap} dt \qquad \text{Equation 1 (as herein defined)}$$

FIG. 3 is similar to FIG. 1, but shows the required signals $V_{cap}$, $I_{prim}$ and ground being delivered on outputs 15, 16, and 17 respectively.

FIG. 4 shows how these three signals are processed in accordance with Equation 1 to provide the reconstructed output current $I_{out}$. The signal $V_{cap}$ is scaled by a capacitive divider and fed to an integrator 18. The signal $I_{prim}$ is scaled in an amplifier 19 and the necessary subtraction is carried out in an algebraic summation circuit 20, including an operational amplifier 22, to produce the $I_{out}$ signal on line 23.

FIG. 5 is similar to FIG. 1 but shows an auxiliary winding 24 associated with the transformer.

FIG. 6 shows an equivalent circuit of the transformer of FIG. 5 with leakage inductance modelled at the secondary side. In this case:

$$I_{out} = A I_{prim} - B \int V_{aux} dt \qquad \text{Equation 2 (as herein defined)}$$

where A and B are constants depending on the degree of coupling of the auxiliary winding with the primary and secondary windings of the transformer. If $Ls_{aux1}$ is very much greater than $Ls_{aux2}$, the auxiliary winding is coupled to the secondary winding of the transformer. If $Ls_{aux1}$ is very much smaller than $Ls_{aux2}$ the auxiliary winding is fully coupled to the primary winding of the transformer. In Equation 2, the second term on the right-hand side is representative of the magnetising current.

FIG. 7 shows how the signals Vaux and $I_{prim}$ are processed in accordance with Equation 2 to provide the reconstructed output current $I_{out}$. The $V_{aux}$ signal is fed to an integrator 25 and scaled by factor B. The $I_{prim}$ signal is scaled by factor A in an amplifier 26, the outputs of the integrator 25 and amplifier 26 being subtracted in an algebraic summer 27, including an operational amplifier 28, to deliver the $I_{out}$ signal on line 29.

The auxiliary winding is not necessarily wound at the secondary (mains isolated) side of the transformer, so that an error due to non-ideal coupling can be corrected by selecting appropriate values for the factors A and B in Equation 2.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present application or of any further application derived therefrom.

The invention claimed is:

1. An electrical power converter comprising
   a transformer having a primary circuit and a secondary circuit, the primary circuit being energisable by an AC signal to induce a secondary AC signal across the secondary circuit for delivering a load current,
   detecting circuitry for deriving an electrical signal representative of the load current, wherein the detecting circuitry comprises a circuit element for deriving a first electrical signal representative of the current in the primary circuit,
   auxiliary circuitry for deriving a second electrical signal representative of the magnetising current flowing in the transformer and
   computational circuitry for combining the first and second signals so as effectively to subtract the second signal from the first signal to derive a difference signal which is representative of the load current reflected onto the primary side of the transformer and is accordingly representative of the actual load current,
      wherein the auxiliary circuitry comprises an auxiliary winding across which an auxiliary voltage is induced and integrating circuitry for integrating the auxiliary voltage with respect to time to derive the second electrical signal and
      wherein the relative magnitudes of the first and second electrical signals are scaled or proportioned in dependence upon the degree of coupling of the auxiliary winding to the primary and secondary circuits.

2. A converter according to claim 1, wherein the computational circuitry calculates the output current in accordance with the Equation:

$$I_{out}=AI_{prim}-B\int Vaux\, dt.$$

* * * * *